(12) United States Patent
Coffin

(10) Patent No.: US 7,581,374 B1
(45) Date of Patent: Sep. 1, 2009

(54) GRASS CUTTING UNIT HAVING COMPRESSION MOLDED UHMW PLASTIC ROLLER

(75) Inventor: Scott M. Coffin, Plymouth, MN (US)

(73) Assignee: The Toro Company, Bloomington, MN (US)

( * ) Notice: Subject to any disclaimer, the term of this patent is extended or adjusted under 35 U.S.C. 154(b) by 396 days.

(21) Appl. No.: 11/235,711

(22) Filed: Sep. 26, 2005

(51) Int. Cl.
*A01D 34/53* (2006.01)

(52) U.S. Cl. .......................................... 56/249; 56/294

(58) Field of Classification Search .................. 56/249, 56/294, 256, 229, 16.4 B
See application file for complete search history.

(56) References Cited

U.S. PATENT DOCUMENTS

| | | | | | |
|---|---|---|---|---|---|
| 621,901 | A | * | 3/1899 | Cornelius | 56/251 |
| 1,385,007 | A | * | 7/1921 | Kerr | 56/249 |
| 2,329,469 | A | * | 9/1943 | Huck | 83/500 |
| 2,334,086 | A | * | 11/1943 | Greiner | 180/20 |
| 2,528,116 | A | * | 10/1950 | Clemson | 56/249 |
| 2,639,572 | A | * | 5/1953 | Goeske | 56/249 |
| 2,660,018 | A | * | 11/1953 | Clemson | 56/249 |
| 2,872,349 | A | * | 2/1959 | Hunn | 428/36.6 |
| 2,912,813 | A | * | 11/1959 | Ellsworth | 56/249 |
| 3,118,268 | A | * | 1/1964 | Benz | 56/255 |
| 3,176,454 | A | * | 4/1965 | Jepson et al. | 56/249 |
| 3,210,825 | A | * | 10/1965 | Johnston | 241/295 |
| 3,372,462 | A | * | 3/1968 | Reid et al. | 29/447 |
| 3,639,958 | A | * | 2/1972 | Griffiths | 492/50 |
| 3,662,528 | A | * | 5/1972 | Akgulian et al. | 56/249 |
| 3,877,125 | A | * | 4/1975 | Finzer | 29/895.21 |
| 3,895,481 | A | * | 7/1975 | Olney et al. | 56/17.5 |
| 3,952,482 | A | * | 4/1976 | Quick | 56/13.9 |
| 3,982,312 | A | * | 9/1976 | Finzer | 492/56 |
| 3,986,716 | A | * | 10/1976 | Taussig et al. | 473/521 |
| 4,075,822 | A | * | 2/1978 | Heckley et al. | 56/16.4 C |
| 4,322,158 | A | * | 3/1982 | Frias et al. | 355/27 |
| 4,685,280 | A | * | 8/1987 | Lloyd et al. | 56/256 |
| 4,821,494 | A | * | 4/1989 | O'Halloran et al. | 56/16.4 C |
| 4,947,630 | A | * | 8/1990 | Rich et al. | 56/249 |
| 5,092,818 | A | * | 3/1992 | Bohman et al. | 460/2 |
| 5,394,681 | A | | 3/1995 | Nolan et al. | |
| 5,511,365 | A | | 4/1996 | Rice | |
| 5,553,380 | A | * | 9/1996 | Rice | 29/895.2 |
| 5,623,817 | A | * | 4/1997 | Bricko et al. | 56/7 |
| 5,628,169 | A | * | 5/1997 | Stiller et al. | 56/7 |
| 5,634,325 | A | * | 6/1997 | Thorman et al. | 56/7 |
| 5,678,396 | A | * | 10/1997 | Thorman et al. | 56/7 |
| 5,826,929 | A | * | 10/1998 | Tisbo et al. | 294/54.5 |
| 5,829,235 | A | | 11/1998 | Rice et al. | |
| 6,131,377 | A | * | 10/2000 | Rice et al. | 56/7 |
| 6,351,929 | B1 | * | 3/2002 | Gust et al. | 56/7 |
| 6,523,336 | B2 | * | 2/2003 | Starr | 56/156 |
| 6,588,191 | B2 | * | 7/2003 | Berndt et al. | 56/249 |
| 2003/0145570 | A1 | * | 8/2003 | Berndt et al. | 56/6 |
| 2005/0000203 | A1 | * | 1/2005 | Rogers et al. | 56/16.7 |

* cited by examiner

*Primary Examiner*—Árpád Fábián-Kovács
(74) *Attorney, Agent, or Firm*—James W. Miller

(57) ABSTRACT

A cutting unit for a mower is supported for rolling over the ground by at least one ground engaging roller. The roller may be grooved over its length to comprise a Wiehle roller. The roller is formed by an ultra high molecular weight plastic roller body that is integrally molded over and around a hollow aluminum tube. The aluminum tube has enlarged diameter knurled ends to help hold the roller body on the tube.

15 Claims, 2 Drawing Sheets

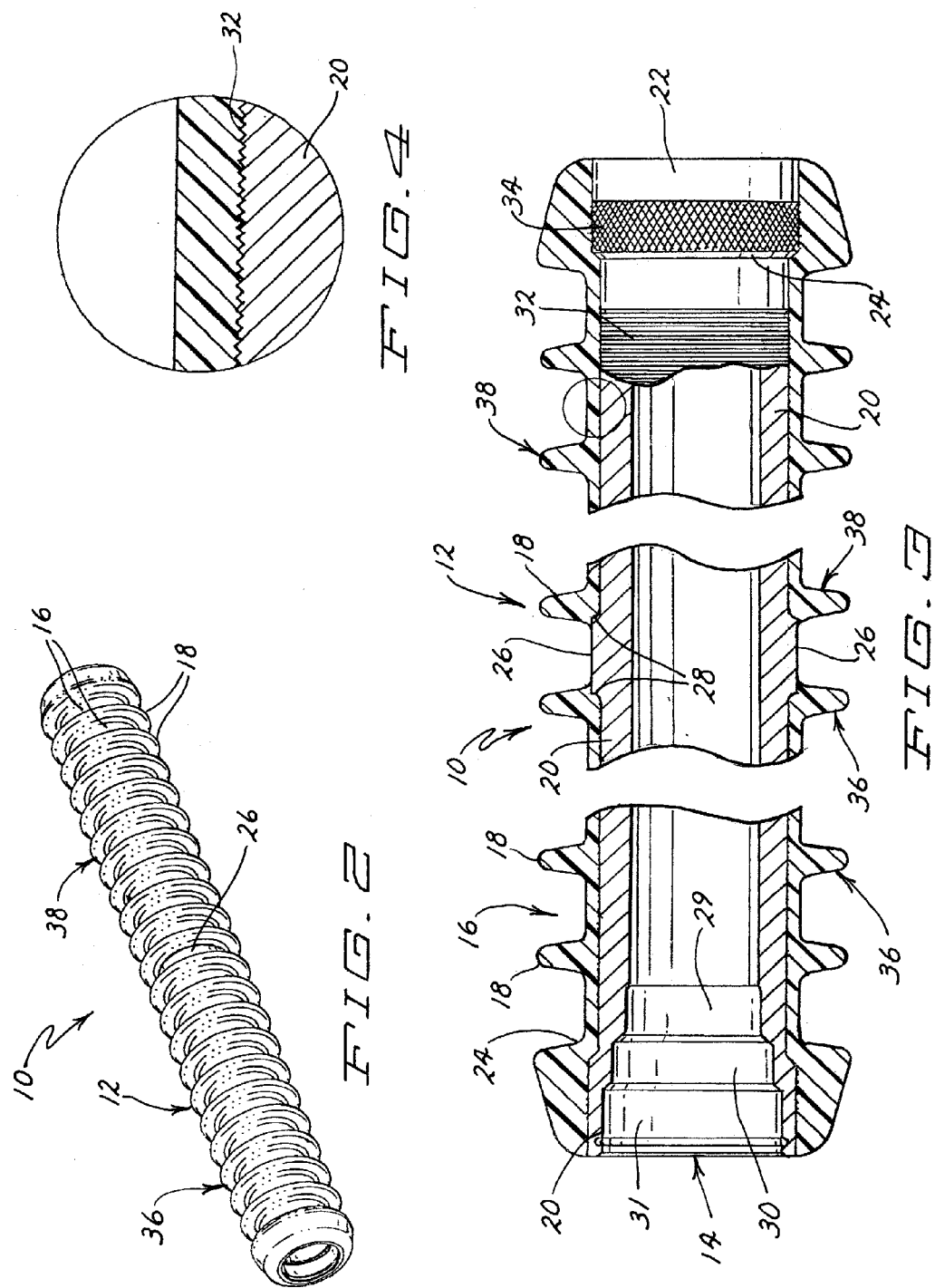

GRASS CUTTING UNIT HAVING COMPRESSION MOLDED UHMW PLASTIC ROLLER

TECHNICAL FIELD

This invention relates to a grass cutting unit of a mower. More particularly, this invention relates to a roller for at least partially supporting the grass cutting unit for rolling on the ground.

BACKGROUND OF THE INVENTION

Reel cutting units are well known for use on greensmowers, fairway mowers and other mowers. Such cutting units are designed for precision grass cutting at relatively low heights of cut. Each cutting unit has a frame that mounts a rotatable cutting reel which sweeps grass against a sharpened bedknife to cut the grass. Front and rear rollers carried on the frame allow the cutting unit to roll over the ground. The cutting unit is linked to the mower so as to be propelled by the motion of the mower.

The front roller on a reel cutting unit is often grooved along its length from one end of the roller to the other. Such a grooved roller is often called a Wiehle roller in the mowing art. The rear roller on a reel cutting unit is usually a smooth cylindrical roller without any grooves. While both front and rear rollers are often used on a reel cutting unit to support the cutting unit for rolling, only one roller, i.e. either a front or rear roller, might be used with the other end of the cutting unit being suspended from the mower.

Various ways are known in the art to manufacture grooved rollers of this type. In one method, a roller body is cast as a solid, integral piece. The roller body is then supported by bearings on a through shaft which is fixed to the cutting unit frame. The roller body rotates relative to the through shaft by virtue of the bearings. When the roller body is cast, it is often cast out of iron.

While grooved rollers can be effectively manufactured in this way, there are disadvantages. If the roller body is cast out of iron, it is relatively heavy. U.S. Pat. No. 5,394,681 discloses a cast aluminum roller body which would be lighter than cast iron, but hardness and durability then become an issue. The aluminum roller body disclosed in the 681 patent has to be provided with a hard anodized coating. This takes away some of the advantages of using aluminum in the first place.

Some grooved rollers are known in which the grooved roller body is made from ultra-high molecular weight (UHMW) polyethylene. Such rollers are disclosed in U.S. Pat. Nos. 5,511,365 and 5,829,235. The plastic roller bodies disclosed in these patents are made from a plurality of separately molded, grooved roller body sections that have to be assembled together.

In the 365 patent, a plurality of separate roller body sections are secured to one another in an end-to-end fashion using metallic collars that bridge between adjacent sections. After the roller body sections are so assembled, the roller body is then secured to a through shaft using similar metallic end collars. The end collars are inserted into the ends of the outermost roller body sections. The end collars are then clamped to the through shaft by set screws to secure the plastic roller body to the through shaft.

In the 235 patent, a plurality of roller body sections are stacked end-to-end against each other but do not use bridging metallic collars between adjacent sections as in the 365 patent. Instead, the roller body sections simply interfit or nest with one another. However, end collars are still used to hold the roller body sections together. These collars are clamped to the through shaft by set screws. Thus, in both the 365 and 235 patents, the through shaft is rotatably mounted in bearings carried on the frame of the grass cutting unit—the through shaft is not a fixed shaft.

While the plastic roller bodies disclosed in the 365 and 235 patents provide grooved rollers that are lighter than cast iron roller bodies, they nonetheless are time consuming to manufacture and assemble. Separate roller body sections must be molded. These sections then must be assembled to form the roller body and connectors are often used to do this. Once the sections are assembled, end collars must be secured to each end of the roller body. The roller body must then be clamped to the through shaft. Thus, the manufacturing process is still labor intensive in terms of assembly time and component cost, which raises the costs of manufacturing the grooved roller.

In addition, such rollers may be prone to operational difficulties. They are secured to the through shaft using set screws which may loosen and slip. If this happens, or if any of the various other connectors or fasteners loosen, then the grooved roller may not operate or roll properly. This would require replacement or repair.

Accordingly, there is a need in the art for a roller for use on a grass cutting unit. Such a roller should be strong, durable, and light while being easy and inexpensive to manufacture.

SUMMARY OF THE INVENTION

One aspect of this invention relates to a grass cutting unit of a mower. The grass cutting unit comprises a frame that carries at least one grass cutting member. At least one ground engaging roller is carried on the frame for at least partially supporting the frame for rolling over the ground. The roller comprises a plastic roller body integrally molded onto a hollow metallic core.

Another aspect of this invention relates to a grass cutting unit of a mower. The grass cutting unit comprises a frame that carries at least one grass cutting member. At least one ground engaging roller is carried on the frame for at least partially supporting the frame for rolling over the ground. The roller comprises a ultra high molecular weight polyethylene plastic roller body integrally molded onto a hollow aluminum tube. The tube has an enlarged diameter ring at a midpoint of the tube. The ring is not covered by the plastic roller body with the plastic roller body being formed in two sections between each end of the ring and each end of the tube.

Yet another aspect of this invention relates to a grass cutting unit of a mower. The grass cutting unit comprises a frame that carries at least one grass cutting member. At least one ground engaging roller is carried on the frame for at least partially supporting the frame for rolling over the ground. The roller comprises a ultra high molecular weight polyethylene plastic roller body integrally molded onto a hollow aluminum tube. The tube has enlarged diameter ends compared to inner portions of the tube with the plastic roller body covering the enlarged diameter ends of the tube.

BRIEF DESCRIPTION OF THE DRAWINGS

This invention will be described more completely in the following Detailed Description, when taken in conjunction with the following drawings, in which like reference numerals refer to like elements throughout.

FIG. 2 is a perspective view of a cutting unit roller according to this invention, particularly illustrating a grooved Wiehle roller;

FIG. 3 is a cross-sectional view of the cutting unit roller shown in FIG. 2, particularly illustrating a pair of plastic roller body sections integrally molded onto a hollow, metallic core; and FIG. 4 is an enlarged detail view taken in the circled section of FIG. 3 of a section of the interface between the roller body section and the metallic core.

DETAILED DESCRIPTION

Figure 1:
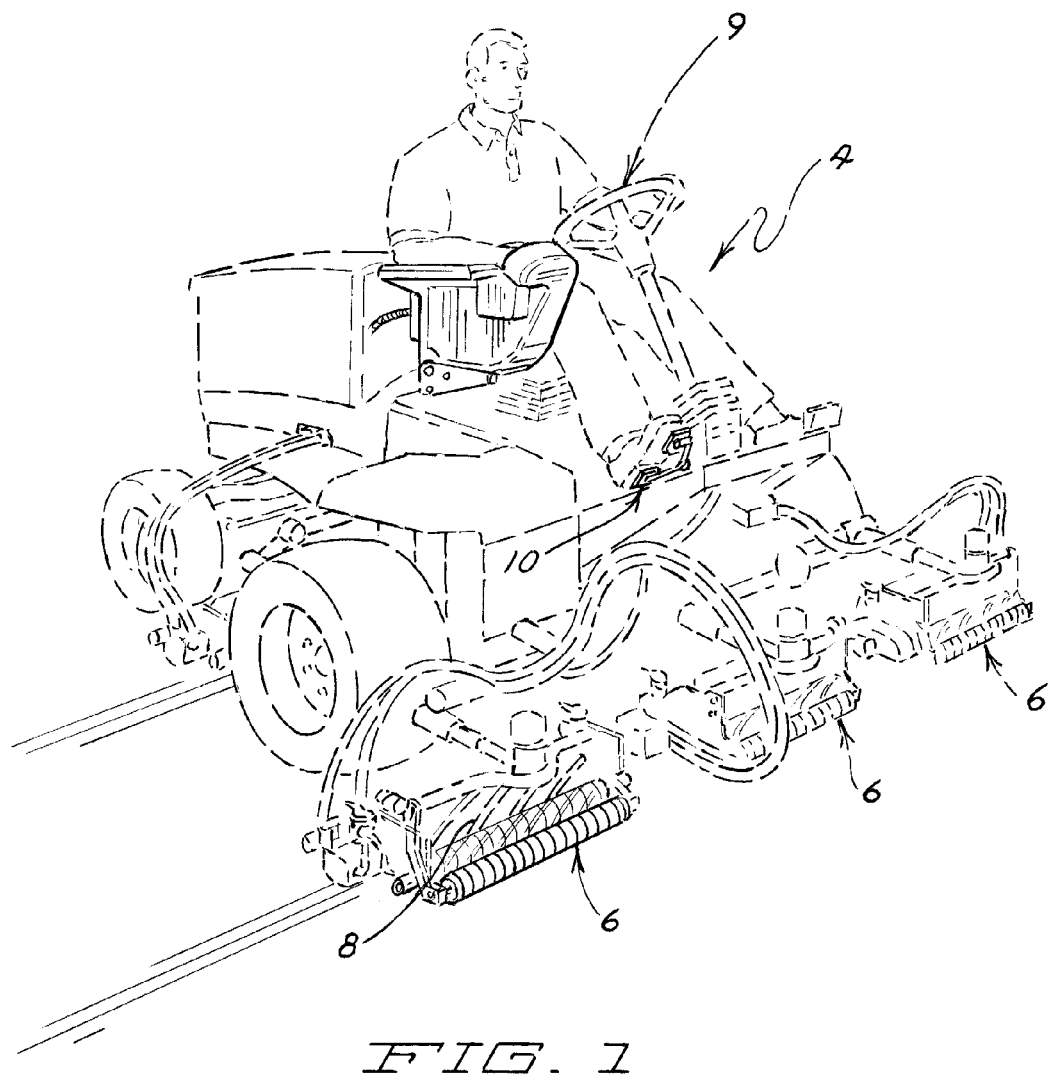
FIG. 1 is a perspective view of a mower having a plurality of grass cutting units which carry the cutting unit roller of this invention.

FIG. 1 depicts a riding mower 4 having a plurality of grass cutting units 6. Three front grass cutting units 6 are shown at the front of mower 4 spaced apart from one another by small gaps. Two trailing grass cutting units 6, only one of which is shown in FIG. 1, are mounted to mower 4 beneath the front and rear wheels of mower 4. Trailing grass cutting units 6 are positioned to cover the gaps between front grass cutting units 6 so that all of the grass cutting units 6 collectively cut a single wide swath of grass as mower 4 moves over the ground.

Each grass cutting unit 6 comprises a frame that includes spaced side plates and a transverse back plate. A rotatable reel 8 having helical blades is journalled between the side plates and in front of the back plate. A sharpened bedknife (not shown) cooperates with reel 8 such that rotation of reel 8 sweeps uncut grass against bedknife 8 to sever the grass. Reel 8 is rotated by a drive system which may comprise a mechanical drive taken from mower 4 or by a separate drive motor (not shown), either hydraulic or electric, connected to reel 8.

Each grass cutting unit 6 is self-supporting for rolling over the ground by front and rear rollers 10. Only front roller 10 is shown. Front roller 10 may be grooved as shown and when so grooved is known in the art as a Wiehle roller. The unshown rear roller typically comprises a smooth cylindrical roller. Together, front and rear rollers 10 support grass cutting unit 6 for rolling over the ground.

The foregoing description of mower 4 and of grass cutting unit 6 has been provided for background purposes only. This invention relates to an improved cutting unit roller 10 for use on a grass cutting unit 6 used on a mower 4. As such, roller 10 of this invention may be used with many types of mowers 4, including rotary mowers having grass cutting units 6 that include one or more blades rotating in horizontal cutting planes, as long as such mowers have at least one ground engaging roller. Thus, this invention is not limited to the specific mower 4 shown herein or to a mower equipped with grass cutting units 6 having reels 8.

One embodiment of a roller 10 according to this invention is illustrated in FIGS. 2-4. Roller 10 comprises a plastic roller body 12 that is compression molded over and around an inner metallic core 14. The mold is shaped to provide a roller body 12 having a plurality of grooves 16 defined by the spaces between a series of transversely spaced annular ribs 18. Thus, roller 10 comprises a roller known in the mowing art as a Wiehle roller. However, the mold could be shaped such that roller body 12 would have a smooth cylindrical outer surface without any grooves 16 or ribs 18.

Core 14 comprises a hollow, cylindrical aluminum tube 20 having enlarged diameter ends 22. An annular, inclined, generally radially extending step 24 is formed at the junction of each tube end 22 and interior portions of tube 20. Similarly, a central, enlarged diameter ring 26 is located approximately at the center of tube 20. Consequently, an annular, generally radially extending shoulder 28 is also formed at the junction of each end of ring 26 with adjacent portions of tube 20.

Tube 20 with its enlarged tube ends 22 and enlarged central ring 26 is preferably integrally cast as a single piece out of aluminum. In one embodiment, tube 20 has a length of 24.5 inches long, a nominal outer diameter of 2.0 inches over the enlarged tube ends 22 and ring 26, a nominal outer diameter of approximately 1.85 inches over the other portions of tube 20, and weighs approximately three pounds. Each tube end 22 and central ring 26 has a length of approximately 0.80 inches.

The inner diameter of tube 20 is provided at each end with three annular cavities 29-31 of progressively increasing diameter. The innermost cavity 29 is sized to receive an inner seal (not shown), the middle cavity 30 is sized to receive a bearing (not shown) and the outermost cavity 31 is sized to receive an outer seal (not shown). When appropriate seals and bearings are inserted into cavities 29-31, tube 20 will be mounted for rotation around a through shaft (not shown) that is fixed to the frame of the grass cutting unit 6. This is how roller 10 is rotatably journalled to grass cutting unit 6.

The outer diameter of tube 10 has a spiral thread 32 extending generally between each tube end 22 and central ring 26. Such a thread 32 is not for the purpose of screwing anything onto tube 10, but simply provides a plurality of grooves extending radially inwardly into tube 20 over most of the length of tube 20. Thread 32 has six threads per inch and a depth of approximately 0.015-0.030 inches.

In addition, approximately the innermost half of each tube end 22 has a knurl 34 on the outer diameter thereof. Knurl 34 provides a highly roughened surface on each tube end 22 immediately adjacent each step 24. Knurl 34 is diamond shaped and projects 0.010-0.015 inches above the enlarged outer diameter of tube end 22. Thread 32 and/or knurl 34 are preferably integrally molded on tube 20 when tube 20 is itself molded, though thread 32 could be cut into tube 20 after tube 20 has been molded.

Roller body 12 is formed from two separate roller body sections 36 and 38 that are compression molded onto tube 20. A first roller body section 36 extends between ring 26 on tube 20 all the way to a first tube end 22. Similarly, a second roller body section extends between ring 26 on tube 20 all the way to the second tube end 22. Thus, the first and second roller body sections 36 and 38 collectively cover the entire length of tube 20 except for ring 26.

Ring 26 of tube 20 is preferably received within some type of fixture in the compression mold such that tube 20 is supported in the compression mold at each end by fixtures or supports inserted into the tube ends 22 as well as by a middle fixture holding or gripping ring 26. Without the middle support provided by ring 26, the Applicants discovered that the high forces used in the compression molding process would at least temporarily bend or flex tube 20 at the middle thereof during the molding process. This would result in an uneven wall thickness of plastic roller body 12 at the middle of roller body 12. However, by providing central ring 26 and by using ring 26 to support tube 20 at the center thereof during the compression molding of roller body 12 onto tube 20, this uneven wall thickness can be avoided. In other words, both the first and second roller body sections 36 and 38 that comprise roller body 12 will have a consistent thickness around tube 20, i.e. the thickness on the top of tube 20 will be substantially the same as on the bottom of tube 20 in any given cross-sectional plane through tube 20.

Ring 26 preferably has approximately the same width as grooves 16 in the molded roller body sections 36 and 38 so that roller 10 has a uniform looking groove/rib pattern along its entire length as shown in FIG. 2. However, this need not be the case. Ring 26 could vary in width from grooves 16 if so desired. In addition, if other ways could be used to support the middle of tube 20 during compression molding of the plastic material onto tube 20 to prevent tube 20 from bending or flexing over the middle, then ring 26 could be deleted and plastic roller body 12 would then be molded over the entire length of tube 20.

The annular step 24 formed at each tube end 22 and the highly roughened knurl 34 on each tube end 22 help hold plastic roller body 12 on tube 20 and keep roller body 12 from sliding or stripping off tube 20. In addition, the grooves formed by spiral thread 32 help provide additional surface area for the plastic of roller body 12 to firmly bond to tube 20. Each roller body section 36 and 38 is molded in a conventional compression molding process preferably using ultra high molecular weight (UHMW) polyethylene.

The cutting unit roller 10 of this invention is both light, durable and strong. For example, a grooved roller 10 built according to this invention will weigh about 4 lbs as compared to 14 lbs for a similar roller 10 which is cast from iron. In addition, because plastic roller body 12 is integrally molded onto tube 20, roller 10 is relatively easy and inexpensive to manufacture. It does not require the numerous assembly steps or fasteners found in prior art plastic rollers in the mower art. Moreover, because of the compression molding process, plastic roller body 12 is securely and integrally bonded to tube 20. There are no fasteners, such as set screws, to come loose.

Various modifications of this invention will be apparent to those skilled in the art. Thus, the scope of this invention is to be limited only by the appended claims.

I claim:

1. A grass cutting unit of a mower, which comprises:
   (a) a frame that carries at least one grass cutting member;
   (b) at least one ground engaging roller carried on the frame for at least partially supporting the frame for rolling over the ground; and
   (c) wherein the roller comprises a plastic roller body integrally molded onto a hollow, substantially cylindrical, metallic tube having enlarged diameter ends, each of the enlarged diameter ends of the tube forming an annular, generally radially extending step at the junction of each tube end and interior portions of the tube, at least a portion of each tube end having an outwardly projecting roughened surface on the enlarged diameter of the tube end, and the plastic roller body being integrally molded over both the steps formed by the large diameter ends of the tube and over the roughened surfaces on the tube ends such that the steps and the roughened surfaces of the tube ends keep the integrally molded roller body from sliding or stripping off the tube.

2. The grass cutting unit of claim 1, wherein the grass cutting member comprises a rotatable reel that rotates about a substantially horizontal axis to sever the grass against a sharpened bedknife carried on the frame.

3. The grass cutting unit of claim 1, wherein each enlarged end of the tube has a predetermined length beginning at the step and extending axially outwardly along the tube, and the outwardly projecting roughened surface extending over at least approximately the innermost half of the length of the tube end.

4. The grass cutting unit of claim 3, wherein the roughened surface comprises a diamond shaped knurl.

5. The grass cutting unit of claim 1, wherein the tube carries a spiral thread between the enlarged ends of the tube.

6. The grass cutting unit of claim 1, wherein the tube is made from aluminum.

7. The grass cutting unit of claim 1, wherein the roller body is made from ultra high molecular weight polyethylene.

8. The grass cutting unit of claim 1, wherein the plastic roller body has a plurality of grooves defined by spaces between a series of transversely spaced annular ribs.

9. The grass cutting unit of claim 1, wherein the plastic roller body is molded in two sections onto the core between an enlarged central ring on the core and each end of the core.

10. A grass cutting unit of a mower, which comprises:
    (a) a frame that carries at least one grass cutting member;
    (b) at least one ground engaging roller carried on the frame for at least partially supporting the frame for rolling over the ground; and
    (c) wherein the roller comprises a ultra high molecular weight polyethylene plastic roller body integrally molded onto a hollow aluminum tube, the tube having an enlarged diameter ring at a midpoint of the tube which ring is not covered by the plastic roller body with the plastic roller body being formed in two sections between each end of the ring and each end of the tube.

11. The grass cutting unit of claim 10, wherein each end of the tube has an enlarged diameter compared to inner portions of the tube and the roller body sections cover the enlarged diameter tube ends.

12. The grass cutting unit of claim 11, wherein the enlarged diameter tube ends have a knurl thereon.

13. The grass cutting unit of claim 11, wherein the tube has a spiral thread over most of the length of the tube between each end of the ring and each enlarged diameter tube end.

14. The grass cutting unit of claim 10, wherein the plastic roller body formed by the roller body sections has a plurality of grooves defined by spaces between a series of transversely spaced annular ribs.

15. The grass cutting unit of claim 14, wherein the ring has a width that is substantially the same as the width of the grooves to have a generally uniform groove and rib appearance across the roller.

* * * * *